(12) United States Patent
Line et al.

(10) Patent No.: US 12,012,055 B2
(45) Date of Patent: *Jun. 18, 2024

(54) TRACK ASSEMBLY FOR A VEHICLE

(71) Applicant: Ford Global Technologies, LLC, Dearborn, MI (US)

(72) Inventors: Johnathan Andrew Line, Northville, MI (US); Joseph Michael Kish, Canton, MI (US); David James Tippy, Ann Arbor, MI (US); Jimmy Moua, Canton, MI (US); Gregory Hagedorn, Bloomfield Hills, MI (US); Adam Ewel, Troy, MI (US); Joshua Gauthier, South Lyon, MI (US); Macit Aktas, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 387 days.

This patent is subject to a terminal disclaimer.

(21) Appl. No.: 17/476,142

(22) Filed: Sep. 15, 2021

(65) Prior Publication Data

US 2022/0001815 A1 Jan. 6, 2022

Related U.S. Application Data

(63) Continuation of application No. 16/574,906, filed on Sep. 18, 2019, now Pat. No. 11,142,149.

(51) Int. Cl.
*B60N 2/00* (2006.01)
*B60N 2/005* (2006.01)
(Continued)

(52) U.S. Cl.
CPC ............ *B60R 16/027* (2013.01); *B60N 2/005* (2013.01); *B60R 16/0215* (2013.01); *B60R 16/037* (2013.01); *H02G 3/283* (2013.01)

(58) Field of Classification Search
CPC . B60Q 3/333; B60Q 3/66; B60Q 3/78; B60Q 3/80; H02B 1/20; H01R 13/639;
(Continued)

(56) References Cited

U.S. PATENT DOCUMENTS

| 5,547,242 A | 8/1996 | Dukatz et al. |
| 6,322,036 B1 | 11/2001 | Tame et al. |

(Continued)

FOREIGN PATENT DOCUMENTS

| JP | H1076872 A | 3/1998 |
| KR | 20050106962 A | 11/2005 |

(Continued)

*Primary Examiner* — Gregory A Blankenship
(74) *Attorney, Agent, or Firm* — Vichit Chea; Price Heneveld LLP

(57) ABSTRACT

A track assembly for a rail-mounted component of a vehicle includes a rail cartridge slidably coupled with a track and defines a first slot. A first electrical connector is positioned within the rail cartridge. A connection cartridge defines a channel. The connection cartridge includes first and second sidewalls joined by a bottom wall. A second electrical connector is positioned within the channel and is configured to selectively engage with the first electrical connector. An actuation member is positioned within the channel and is movable between first and second positions. The actuation member is biased to the first position. An actuator is operably coupled with the actuation member to selectively move the actuation member into the second position against the bias.

19 Claims, 6 Drawing Sheets

(51) Int. Cl.
  *B60R 16/02* (2006.01)
  *B60R 16/027* (2006.01)
  *B60R 16/03* (2006.01)
  *B60R 16/037* (2006.01)
  *H02G 3/00* (2006.01)
  *H02G 3/38* (2006.01)

(58) Field of Classification Search
  CPC .... H01R 13/631; H01R 13/424; B60N 2/005; B60N 2/08; B60N 2/0812; B60N 2/0818; B60N 2/0825; B60N 2/07; B60N 2/06; B60N 2/067; B60N 2/0702; B60N 2/0715; B60N 2/0722; B60N 2/0732; B60R 16/027; B60R 16/0215; H02G 3/283
  See application file for complete search history.

(56) References Cited

U.S. PATENT DOCUMENTS

| | | | |
|---|---|---|---|
| 6,617,744 B2 | 9/2003 | Kershaw et al. | |
| 7,188,805 B2 | 3/2007 | Henley et al. | |
| 7,905,461 B2 | 3/2011 | Noffz | |
| 7,931,246 B2 | 4/2011 | Brewer et al. | |
| 8,628,135 B2 | 1/2014 | Valasin et al. | |
| 9,923,429 B2 | 3/2018 | Osborne et al. | |
| 10,926,663 B2 * | 2/2021 | Tippy | B60N 2/143 |
| 11,072,260 B2 * | 7/2021 | Aktas | B60N 2/43 |
| 11,142,149 B2 * | 10/2021 | Line | B60R 16/037 |
| 11,332,043 B2 * | 5/2022 | Line | B60N 2/0224 |
| 11,332,046 B2 * | 5/2022 | Aktas | B60N 2/3047 |
| 11,407,334 B2 * | 8/2022 | Line | B60N 2/07 |
| 11,433,785 B2 * | 9/2022 | Aktas | B60N 2/43 |
| 2006/0185879 A1 | 8/2006 | Kayumi | |
| 2007/0215778 A1 | 9/2007 | Kadlec et al. | |
| 2010/0289313 A1 | 11/2010 | Moegling et al. | |
| 2012/0145866 A1 * | 6/2012 | Fukuda | B60N 2/0818 248/429 |
| 2018/0105074 A1 * | 4/2018 | Shiraki | B60N 2/07 |
| 2019/0225120 A1 | 7/2019 | Kish et al. | |
| 2020/0189511 A1 | 6/2020 | Ricart et al. | |
| 2020/0194936 A1 | 6/2020 | Ricart et al. | |
| 2020/0269754 A1 | 8/2020 | Ricart et al. | |
| 2020/0282880 A1 | 9/2020 | Jones et al. | |
| 2021/0016681 A1 * | 1/2021 | Tippy | B60P 7/0815 |
| 2021/0053467 A1 * | 2/2021 | Aktas | B60N 2/0732 |
| 2021/0078510 A1 * | 3/2021 | Line | B60R 16/027 |
| 2022/0001815 A1 * | 1/2022 | Line | B60R 16/027 |
| 2022/0324355 A1 * | 10/2022 | Moulin | B60N 2/933 |

FOREIGN PATENT DOCUMENTS

| | | |
|---|---|---|
| WO | 2006053145 A1 | 5/2006 |
| WO | 2007112071 A2 | 10/2007 |

* cited by examiner

TRACK ASSEMBLY FOR A VEHICLE

CROSS-REFERENCE TO RELATED APPLICATION

This application is a continuation of U.S. application Ser. No. 16/574,906, filed on Sep. 18, 2019, now U.S. Pat. No. 11,142,149, entitled "TRACK ASSEMBLY FOR A VEHICLE," the disclosure of which is hereby incorporated herein by reference in its entirety.

FIELD OF THE DISCLOSURE

The present disclosure generally relates to a track assembly, and more specifically, to a track assembly for a vehicle.

BACKGROUND OF THE DISCLOSURE

Modern vehicle seats are often adjusted within or removed from a vehicle. This adjustability and removability needs to accommodate electrical connections between the vehicle seat and the vehicle.

SUMMARY OF THE DISCLOSURE

According to a first aspect of the present disclosure, a track assembly for a rail-mounted component of a vehicle includes a rail cartridge slidably coupled with a track and defines a first slot. A first electrical connector is positioned within the rail cartridge. A connection cartridge defines a channel. The connection cartridge includes first and second sidewalls joined by a bottom wall. A second electrical connector is positioned within the channel and is configured to selectively engage with the first electrical connector. An actuation member is positioned within the channel and is movable between first and second positions. The actuation member is biased to the first position. An actuator is operably coupled with the actuation member to selectively move the actuation member into the second position against the bias.

Embodiments of the first aspect of the present disclosure can include any one or a combination of the following features:
- a coupling protrusion that extends from a first end of the connection cartridge and is received by a first receiving space of the rail cartridge;
- a retention feature that extends from one of the first and second sidewalls of the connection cartridge and receives the actuation member;
- links that are operably coupled with the second electrical connector and the actuation member;
- a latch that is configured to engage a striker positioned proximate a second receiving space to couple the connection cartridge with the rail cartridge; and
- the first and second electrical connectors are electrically engaged when the latch is engaged with the striker.

According to a second aspect of the present disclosure, a track assembly, includes a rail cartridge that is slidably coupled with a track and defines a slot. A first electrical connector is positioned within the rail cartridge below the slot. A connection cartridge defines a channel and includes a second electrical connector positioned within the channel and configured to selectively engage with the first electrical connector. An actuation member has a first end that is coupled with the second electrical connector. The connection cartridge also includes a biasing member that urges the actuation member to a first position. The actuation member is moved to a second position when an actuator contacts the rail cartridge of the track.

Embodiments of the second aspect of the present disclosure can include any one or a combination of the following features:
- a latch that is coupled with the connection cartridge and configured to receive a striker positioned on the rail cartridge;
- the latch is further configured to couple the connection cartridge with the rail cartridge;
- a seal that is positioned about a periphery of the slot;
- the first and second electrical connectors are configured to transfer data to and from a vehicle to a rail-mounted component;
- the track includes first and second lateral walls each with a C-shape;
- the rail cartridge is positioned between and substantially flush with each of the first and second lateral walls;
- the connection cartridge is coupled with a storage unit; and
- the first and second electrical connectors are configured to transfer power to and from a vehicle to a rail-mounted component.

According to a third aspect of the present disclosure, a track assembly includes a rail cartridge slidably coupled with a track. A first electrical connector is positioned within the rail cartridge. A connection cartridge defines a channel and includes a second electrical connector configured to selectively engage with the first electrical connector. An actuation member is positioned within the channel of the connection cartridge and coupled with the second electrical connector. The actuation member is movable between first and second positions. An actuator is operably coupled with the actuation member. The actuator is moved upward to move the actuation member to the second position when the actuator contacts the rail cartridge of the track.

Embodiments of the third aspect of the present disclosure can include any one or a combination of the following features:
- the actuator includes a tab that extends downward from the connection cartridge and the tab is configured to abut a top wall of the rail cartridge;
- the connection cartridge further includes a latch coupled with an end of the connection cartridge;
- a striker is positioned within the rail cartridge proximate a receiving space and the latch is configured to engage the striker;
- a biasing member that urges the actuation member to the first position; and
- the biasing member is fixed when the latch is in an unlocked position and the biasing member is rotatable when the latch is in a locked position.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
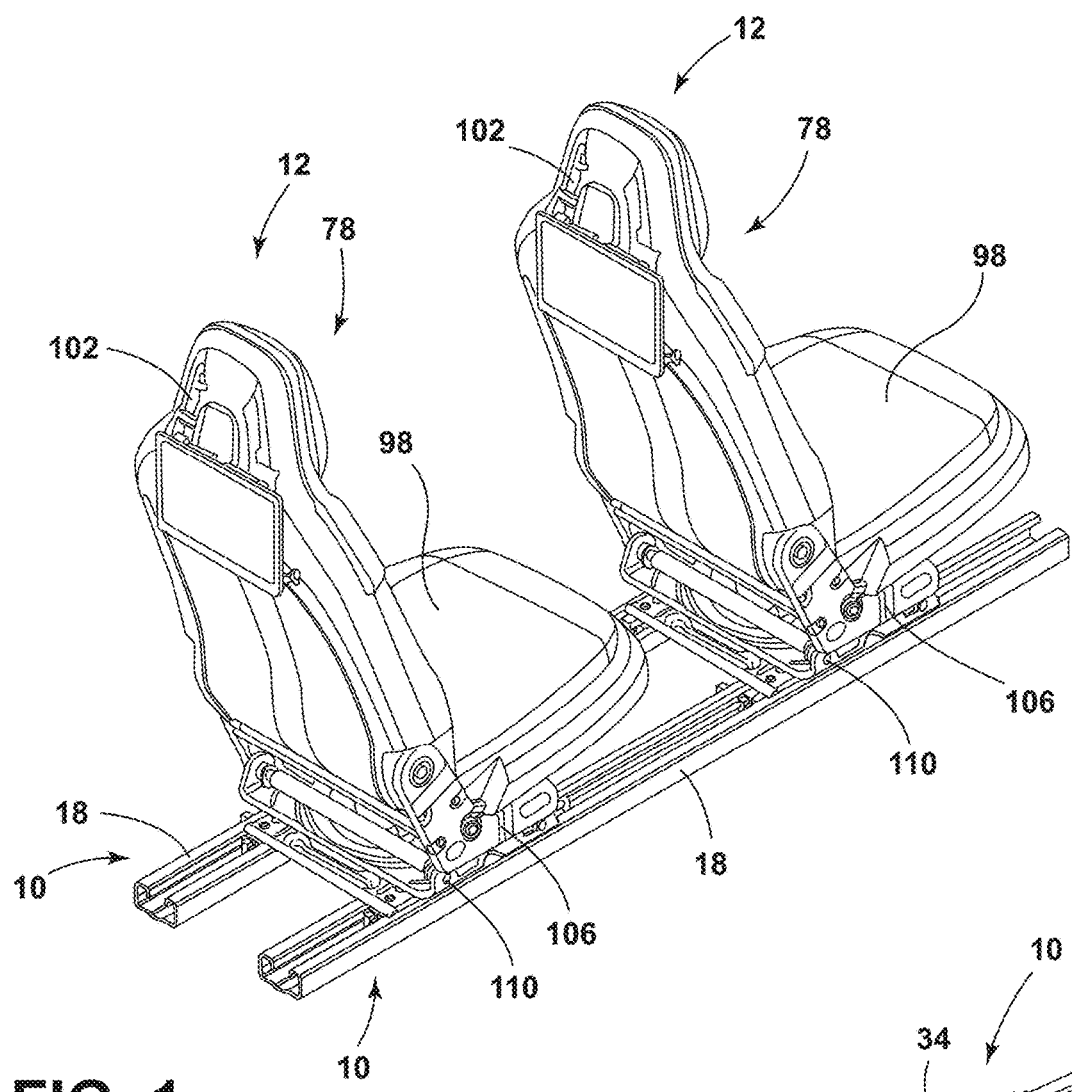
FIG. 1 is a side perspective view of a pair of seating assemblies coupled with a track assembly, according to various examples.

The present illustrated embodiments reside primarily in combinations of method steps and apparatus components related to a track assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 2:
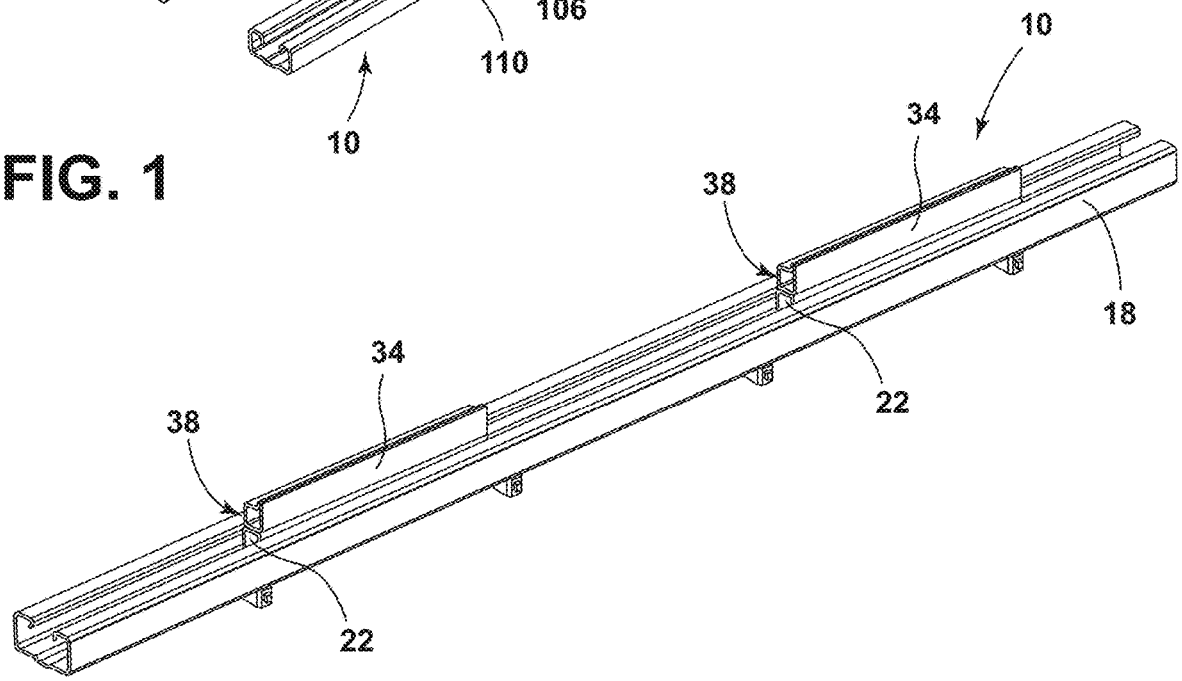
FIG. 2 is a side perspective view of a single track assembly prior to engagement with a seating assembly.

For purposes of description herein, the terms "upper," "lower," "right," "left," "rear," "front," "vertical," "horizontal," and derivatives thereof shall relate to the disclosure as oriented in FIG. 2. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-7, reference numeral 10 generally designates a track assembly for use in a vehicle 14. The track assembly 10 is used to couple a rail-mounted component 12 within the vehicle 14 and includes a track 18 and a rail cartridge 22. The rail cartridge 22 is slidably coupled within the track 18 and defines a first slot 26. A first electrical connector 30 is positioned within the rail cartridge 22. The first electrical connector 30 may be configured to at least partially extend into and/or through the first slot 26. A connection cartridge 34 defines a channel 38 and is selectively coupled with the rail cartridge 22. The connection cartridge 34 includes first and second sidewalls 42, 46 that are joined by a bottom wall 50. The bottom wall 50 defines a second slot 54 in communication with the channel 38. A second electrical connector 58 is positioned within the channel 38 and may be configured to selectively extend through the second slot 54. An actuation member 62 is positioned within the channel 38 and is movable between a first position and a second position. A spring 66 is also positioned within the channel 38 and is operably coupled to the actuation member 62. The spring 66 is configured to bias the actuation member 62 into the first position. An actuator 70 extends through the bottom wall 50 and is operably coupled with the actuation member 62. The actuation member 62 is moved to the second position when the actuator 70 is compressed by contact with the rail cartridge 22. A latch 74 extends from the connection cartridge 34 and is configured to couple with the connection cartridge 34 and the rail cartridge 22.

Referring now to FIGS. 1 and 2, the vehicle 14 may be provided with a plurality of rail-mounted components 12 slidably coupled with the track assembly 10. The rail-mounted components 12 may be, but are not limited to, seating assemblies, floor consoles, center consoles, storage units that include multiple storage compartments, and the like. In various examples, the rail-mounted component 12 may be removably coupled with the track assembly 10 by rail cartridges 22 and connection cartridges 34, as discussed herein.

Each of the rail-mounted components 12 may be slidably coupled with a floor 82 of the vehicle 14 by the track assembly 10. Each track assembly 10 may include one or more tracks 18. The tracks 18 may be positioned in spaced-apart pairs within the vehicle 14, as illustrated in FIGS. 1 and 2. The tracks 18 may extend from a front of the cabin 94 of the vehicle 14 to a rear of the cabin 94 of the vehicle 14, or may extend only partially through the cabin 94 of the vehicle 14. The tracks 18 can be arranged along longitudinal, lateral, and/or angular (e.g., diagonal) directions within the cabin 94. As illustrated in FIG. 1, the tracks 18 are aligned in a longitudinal direction within the cabin 94, and the track assemblies 10, as arranged, are parallel to a longitudinal axis 96 of the vehicle 14. Each track 18 may be integrally formed with the floor 82 of the vehicle 14. Alternatively, each track 18 may be coupled with the floor 82 of the vehicle 14. The tracks 18 may be positioned beneath a floor cover of the vehicle 14, or the tracks 18 may extend above the floor cover of the vehicle 14 and protrude into the cabin 94 of the vehicle 14. In other words, the tracks 18 of the track assemblies 10 may be visible or hidden, depending on the configuration the vehicle 14. It will be understood that the track assemblies 10 and tracks 18 may be used in any vehicle 14 including, for example, coupes, sedans, sport utility vehicles (SUVs), trucks, etc. It will further be understood that the configuration of the tracks 18 of the track assemblies 10 may be adjusted to accommodate the vehicle type.

Referring now to FIG. 2, where the rail-mounted components 12 are seating assemblies 78, the seating assemblies 78 may be positioned at various locations along the tracks 18, and may be translatable along the tracks 18 within the vehicle 14. Each seating assembly 78 includes a seat base 98 operably coupled with a seatback 102. The seat base 98 and the seatback 102 may be pivotably coupled to one another by way of a carrier 106. The carrier 106 may be directly coupled to the track assembly 10 (e.g., by anchors). Alternatively, the carrier 106 may be coupled to the track assembly 10 indirectly. For example, the carrier 106 may be coupled with a carriage 110 that may be integrally formed with, or coupled with, one or more connection cartridges 34.

Figure 3:
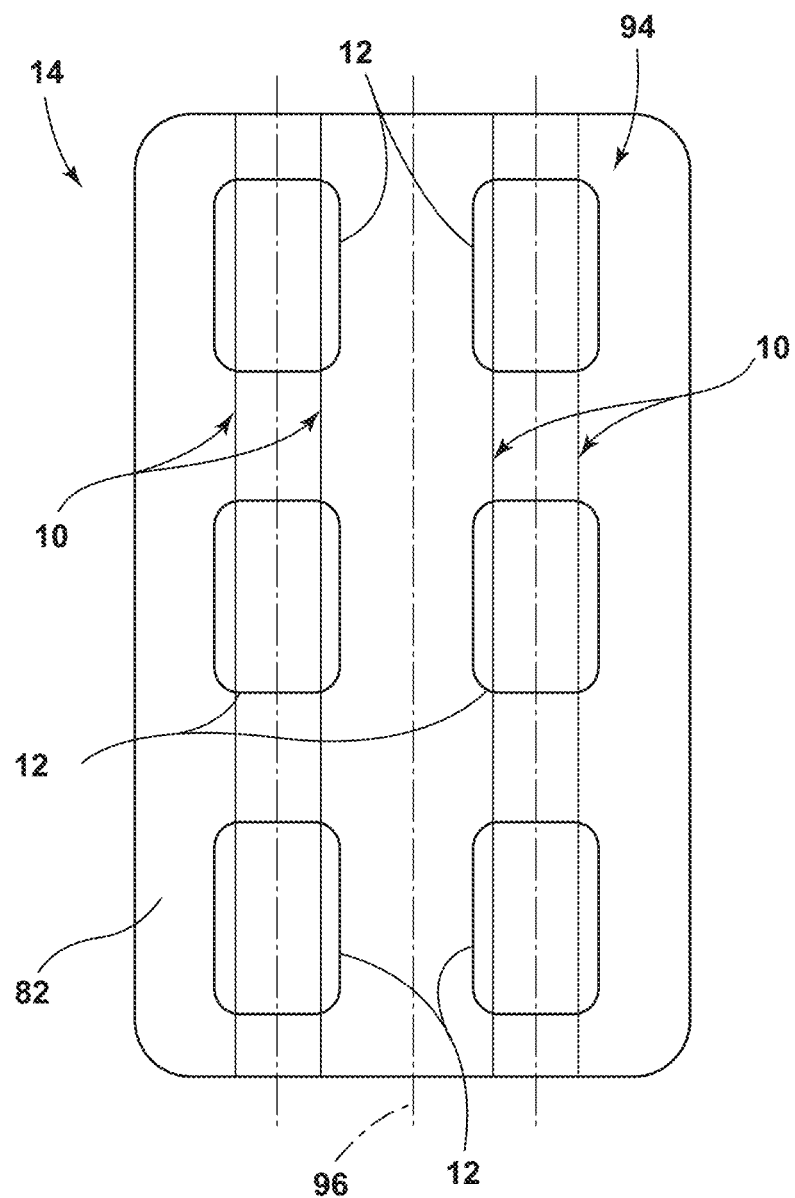
FIG. 3 is a schematic top view of a cabin of a vehicle including a track assembly, according to various examples.

As shown in FIGS. 1-3, one or more rail cartridges 22 may be slidably coupled with each of the tracks 18 of the track assembly 10. Each of the rail cartridges 22 may be movable along the respective track 18 in a forward or rearward direction through the cabin 94 of the vehicle 14. According to various examples, the rail cartridges 22 may be positioned in pairs and may be configured to move along the respective track 18 at the same rate so that the rail cartridges 22 within the pair of rail cartridges 22 remain aligned. It will be understood that each track 18 is uniform in size, shape, and engagement and is interchangeable with any other track 18. It will be further understood that each rail cartridge 22 is uniform in size, shape, and engagement and is interchangeable with any other rail cartridge 22.

Figure 4:
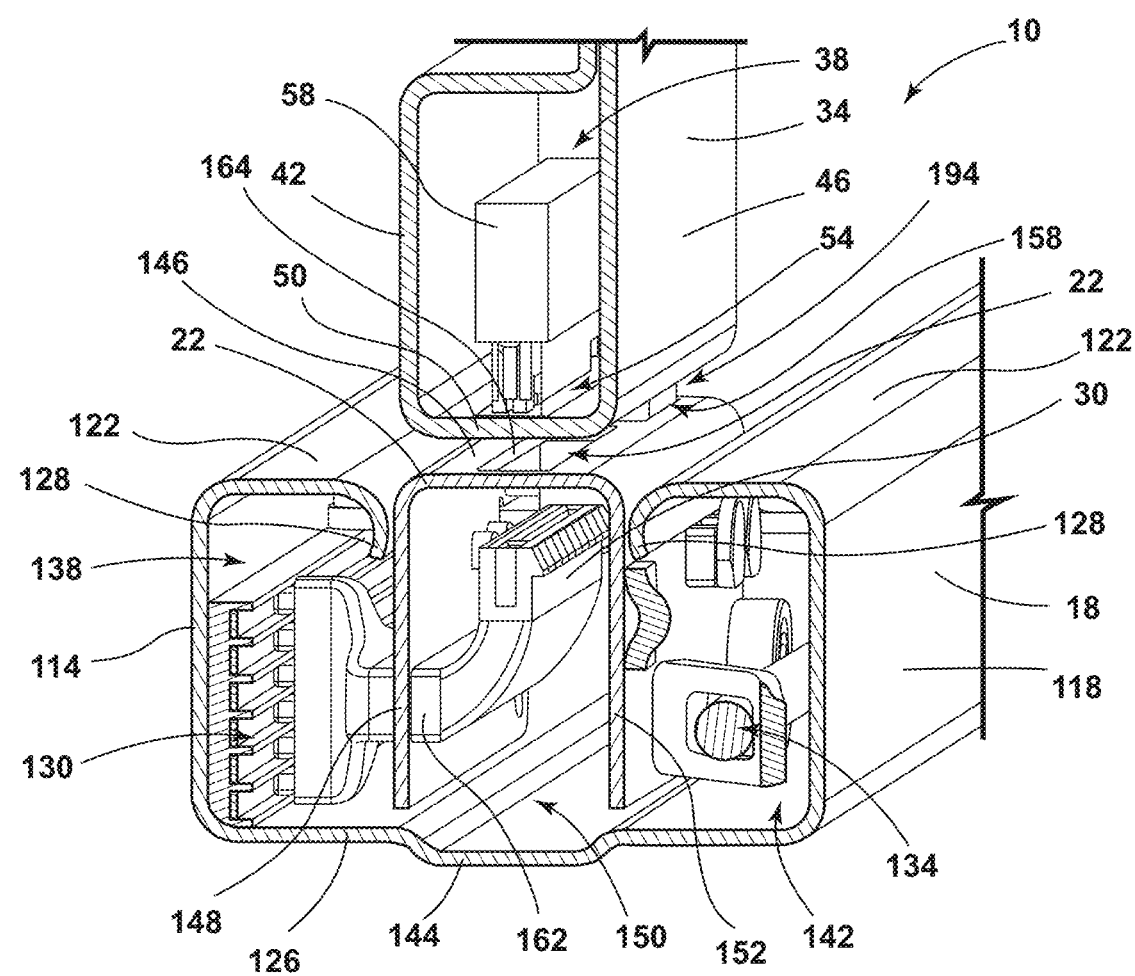
FIG. 4 is a cross-sectional view of a track assembly when a connection cartridge is disengaged from a rail cartridge.
Figure 5:
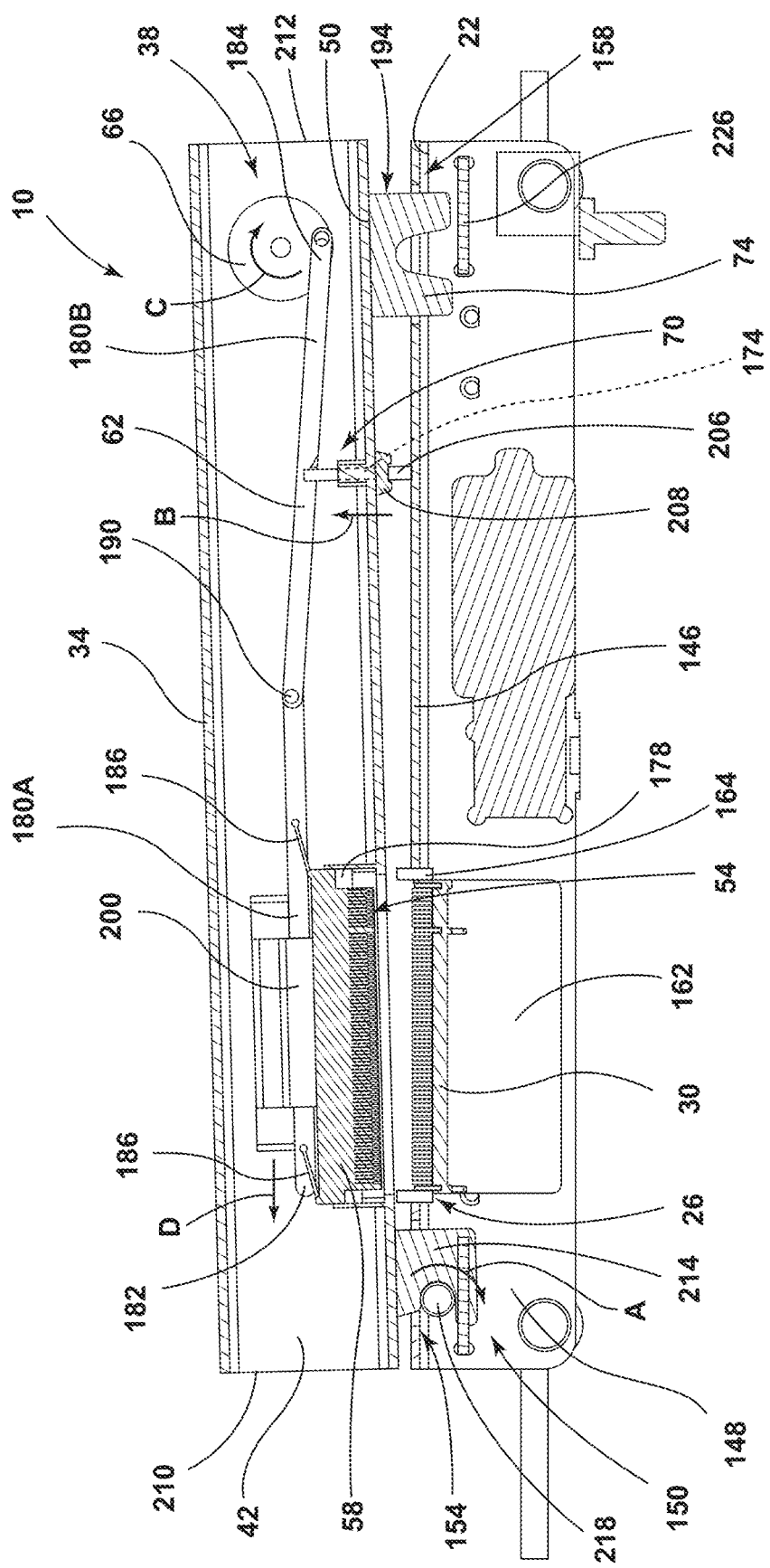
FIG. 5 is a cross-sectional view of a connection cartridge disengaged from a rail cartridge.
Figure 6:
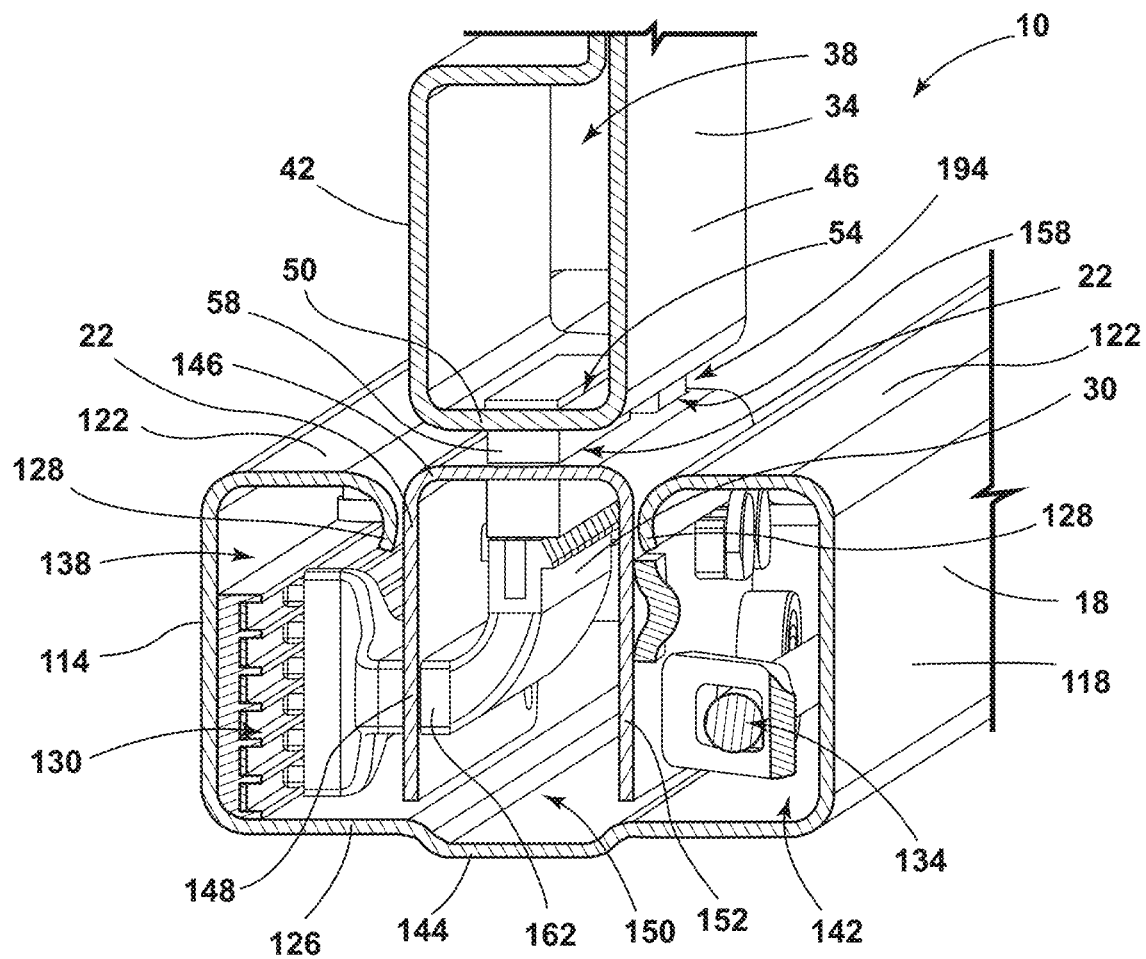
FIG. 6 is a cross-sectional view of a track assembly when a connection cartridge is engaged with a rail cartridge.

With reference now to FIGS. 4-7, a track assembly 10 that has a track 18, rail cartridge 22, and connection cartridge 34 is exemplarily illustrated. As shown in FIGS. 4 and 6, each of the tracks 18 includes first and second lateral walls 114, 118 that are joined by a bottom wall 126. Each of the first and second lateral walls 114, 118 includes a top portion 122 and may be generally C-shaped, such that the top portion 122 of each lateral wall 114, 118 is substantially parallel with the bottom wall 126. Each of the first and second lateral walls 114, 118 may further include an interior lip 128 that extends from the respective top portion 122 toward the bottom wall 126. The first lateral wall 114 of each of the tracks 18 defines a first lateral channel 138 configured to receive an electrical conductor assembly 130. The electrical conductor assembly 130 is configured to provide power and/or data to the seating assembly 78 (FIG. 2). The second lateral wall 118 defines a second lateral channel 142 configured to receive a motor and gear assembly 134. A central channel 150 is also defined by the track 18 between the first and second lateral channels 138, 142. In various examples, the bottom wall 126 may include a step 144 configured to further define the central channel 150. The central channel 150 is in communication with each of the first and second lateral channels 138, 142 and is configured to receive one or more of the rail cartridges 22.

The rail cartridge 22 may be an elongated member that includes a top wall 146 that extends between the first and second sidewalls 42, 46. For example, each rail cartridge 22 may have a U-shaped cross-section. When the rail cartridge 22 is received by the central channel 150 of the track 18, the rail cartridge 22 fits within the track 18, such that the first and second lateral channels 138, 142 and the central channel 150 are generally inaccessible without removal of the rail cartridge 22. In other words, the rail cartridge 22 substantially encloses the central channel 150 of the track 18 along the length of the rail cartridge 22. The top wall 146 of the rail cartridge 22 is aligned with the top portion 122 of each of the first and second lateral walls 114, 118 of the track 18. Further, the interior lips 128 of the first and second lateral walls 114, 118 may be positioned flush with the respective sidewalls 148, 152 of the rail cartridge 22.

Referring still to FIGS. 4-7, the top wall 146 of the rail cartridge 22 may define first and second receiving spaces 154, 158 positioned proximate opposing ends of the rail cartridge 22. The first slot 26 is defined between, and spaced apart from, the first and second receiving spaces 154, 158. In various examples, the first and second receiving spaces 154, 158 and the first slot 26 may be substantially similar in size. In other examples, the first slot 26 may have a larger area than the first and second receiving spaces 154, 158, or the first slot 26 may have a smaller area than the first and second receiving spaces 154, 158. The first and second receiving spaces 154, 158 may be substantially the same, or may vary in dimensions from one another.

The first electrical connector 30 may be positioned within the rail cartridge 22 and may be enclosed within the central channel 150. The first electrical connector 30 may be operably coupled with a support housing 162 configured to guide the positioning of the first electrical connector 30. The support housing 162 may be generally J-shaped, as illustrated in FIGS. 4 and 6, and may extend through, or beneath, one of the first and second sidewalls 42, 46 of the rail cartridge 22. The support housing 162 may further be configured to couple the first electrical connector 30 with the conductor assembly 130 positioned within the first lateral channel 138 of the respective track 18. As illustrated in FIGS. 4-7, the first electrical connector 30 may be configured to be a brush card connector. However, it will be understood that the first electrical connector 30 may be any electrical connector configured to transfer power and/or data to the seating assembly 78 (FIG. 2).

The support housing 162 is positioned within the central channel 150, such that the first electrical connector 30 is aligned with the first slot 26 of the rail cartridge 22. In various examples, the first electrical connector 30 may extend upward through the first slot 26. In other examples, the first electrical connector 30 may be received by the first slot 26, such that the first electrical connector 30 is flush with the top wall 146 of the rail cartridge 22. In still other examples, the first electrical connector 30 may be fully received by the central channel 150, such that the first electrical connector 30 is positioned below the first slot 26 but does not extend into, or through, the first slot 26.

In some examples, a first seal 164 may be positioned about the first slot 26 and coupled with the top wall 146 of the respective rail cartridge 22. The first seal 164 may be configured to seal the first slot 26 to prevent liquid ingress around the first electrical connector 30 and into the central channel 150. In other examples, the first seal 164 may be positioned over the first slot 26 such that one or both of the first or second electrical connectors 30, 58 are configured to pass through the first seal 164 to create a liquid-tight seal.

Referring now to FIGS. 2-7, as discussed above, the connection cartridge 34 may be coupled with a rail-mounted component 12 such as the seating assembly 78. For example, the connection cartridge 34 may be operably coupled with the seat base 98 of the seating assembly 78. Alternatively, the connection cartridge 34 may be operably coupled with the carrier 106 or the carriage 110. It will be understood that the connection cartridge 34 has the same size, shape, and engagement method as any other connection cartridge 34 of the track assembly 10, such that the connection cartridge 34 may be coupled with any one of the rail cartridges 22 of the track assembly 10.

Referring again to FIGS. 4-7, the connection cartridge 34 includes the first and second sidewalls 42, 46 that are joined by the bottom wall 50 to define the upper channel 38. The bottom wall 50 of the connection cartridges 34 define the second slot 54, which is in communication with the upper channel 38. The second slot 54 may be sized to complement the first slot 26 of the rail cartridge 22. When the connection cartridge 34 is engaged with the rail cartridge 22, the first slot 26 and the second slot 54 are aligned.

The second electrical connector 58 is positioned within the upper channel 38 of the connection cartridge 34. The second electrical connector 58 is aligned with the second slot 54 and is configured to be engaged with the first electrical connector 30 of the rail cartridge 22. As illustrated in FIGS. 4-7, the second electrical connector 58 is a brush card connector. However, it will be understood that the second electrical connector 58 may be any electrical connector configured to transfer power and/or data to the seating assembly 78 (FIG. 2). It will further be understood that the first and second electrical connectors 30, 58 are selected such that the first and second electrical connectors 30, 58 may be electrically engaged.

In some examples, the second electrical connector 58 may include a second seal 178 that is coupled with a periphery of the second electrical connector 58. The second seal 178 is configured to seal the second slot 54 to prevent liquid ingress around the second electrical connector 58. In other examples, the second seal 178 may be positioned about the periphery of the second slot 54 or over the second slot 54 such that the second electrical connector 58 is configured to pass through the seal 178 to create a liquid-tight seal around the second electrical connector 58.

Figure 7:
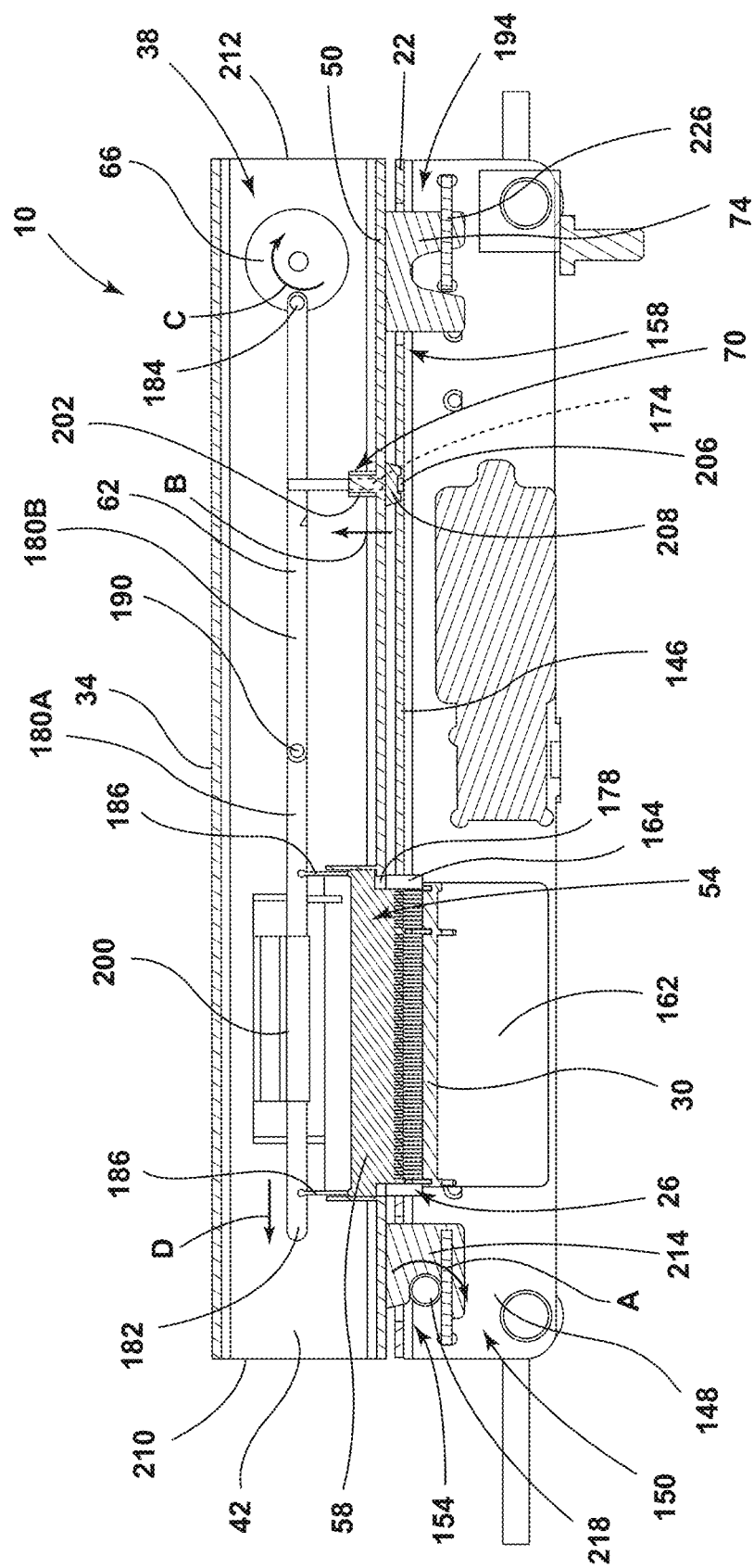
FIG. 7 is a cross-sectional view of a connection cartridge engaged with a rail cartridge.

The actuation member 62 is positioned within the upper channel 38 of the connection cartridge 34. As illustrated in FIGS. 5 and 7, the actuation member 62 includes first and second arms 180A, 180B that are operably coupled at a central pivot 190. A first end 182 of the actuation member 62 is an end of the first arm 180A opposite the central pivot 190, and a second end 184 of the actuation member 62 is an end of the second arm 180B opposite the central pivot 190. Alternatively, the actuation member 62 may be a single arm that includes both of the first and second ends 182, 184.

Referring again to FIGS. 5 and 7, the first end 182 of the actuation member 62 is operably coupled with the second electrical connector 58. As illustrated in FIGS. 5 and 7, links 186 may be hingedly coupled with opposing sides of the second electrical connector 58. The links 186 may also be hingedly coupled with the actuation member 62 proximate the first end 182 of the actuation member 62. The links 186 are configured to remain parallel as the links 186 are rotated and are further configured to couple the second electrical connector 58 with the actuation member 62.

The actuation member 62 is movable between a first and second positions, configured to raise and lower the second electrical connector 58 through the second slot 54, respectively. When the actuation member 62 is in the first position, the first end 182 of the actuation member 62 is aligned with the first electrical connector 30, as illustrated in FIG. 5. The links 186 are angled so that the second electrical connector 58 is fully received within the upper channel 38 of the connection cartridge 34. When the actuation member 62 is in the second position, the first end 182 of the actuation member 62 extends past the second electrical connector 58. The adjustment of the first end 182 beyond the second electrical connector 58 is configured to rotate the links 186 to extend vertically from the actuation member 62. The vertical positioning of the links 186 pushes the second electrical connector 58 downward through at least the second slot 54 of the connection cartridge 34.

With reference again to FIGS. 5 and 7, the latch assembly 194 is coupled with each of the connection cartridges 34. The latch assembly 194 is positioned on the connection cartridge 34 and/or may be at least partially received within the upper channel 38. The latch assembly 194 includes at least the latch 74 protruding from the connection cartridge 34 and the spring 66 positioned within the upper channel 38. The spring 66 is operably coupled with the second end 184 of the actuator member 62 and is movable between a neutral state and a rotated state. In the neutral state, the spring 66 is configured to bias the actuation member 62 into the first position. It will be understood that the spring 66 may be any spring configured to be operably coupled with the latch assembly 194.

Referring still to FIGS. 5 and 7, in various examples, one of the first and second sidewalls 42, 46 of the connection cartridge 34 includes a retention feature 200. The retention feature 200 is configured to extend from an interior surface of one of the first and second sidewalls 42, 46 and into the upper channel 38. The retention feature 200 may be integrally formed with one of the first or second sidewalls 42, 46, or may be operably coupled with one of the first and second sidewalls 42, 46. The retention feature 200 is configured to guide and/or retain the actuation member 62 within the upper channel 38 to prevent inadvertent disconnection of the actuation member 62 from any one of the spring 66, the actuator 70, and/or the second electrical connector 58.

The bottom wall 50 of the connection cartridge 34 may further define an actuator aperture 174 configured to receive the actuator 70. In some examples, the actuator aperture 174 may be defined by an upwardly extending protrusion 202 of the bottom wall 50. The actuator 70 is operably coupled with the actuation member 62 between the first and second ends 182, 184 of the actuation member 62, and extends from the actuation member 62 to be at least partially received by the actuator aperture 174. It is contemplated that the actuator aperture 174 may be sealed without departing from the scope of the present disclosure.

As illustrated in FIGS. 5 and 7, the actuator 70 is positioned proximate the second end 184 and includes a tab 206. The tab 206 is positioned through the actuator aperture 174 to extend beyond the bottom wall 50 of the connection cartridge 34. In various examples, the tab 206 may be positioned within a housing 208, and the housing 208 may be positioned through the actuator aperture 174 to guide the positioning of the tab 206. The tab 206 is movable between a compressed state and a decompressed state. The compressed state of the tab 206 corresponds with the locked position of the latch assembly 194. When the connection cartridge 34 is disengaged from the rail cartridge 22, the tab 206 is in the decompressed state. When the connection cartridge 34 is engaged with the rail cartridge 22, the tab 206 is configured to abut the top wall 146 of the rail cartridge 22. The contact of the tab 206 with the top wall 146 moves the tab 206 into the compressed state.

A coupling protrusion 214 extends downward from a first end 210 of the connection cartridge 34. The coupling protrusion 214 is positioned to be received by the first receiving space 154 of the rail cartridge 22. As illustrated in FIGS. 5 and 7, the coupling protrusion 214 is substantially hook shaped, and is configured to engage with a first striker 218 of the rail cartridge 22. The first striker 218 is positioned within the central channel 150 of the respective rail cartridge 22 proximate the first receiving space 154. It is contemplated that the coupling protrusion 214 may be any shape or style of protrusion (e.g., a secondary latch, U-shaped hook, etc.) configured to couple the connection cartridge 34 with the rail cartridge 22. It is further contemplated that the coupling protrusion 214 may be coupled with any receiving feature positioned within the rail cartridge 22 proximate the first receiving space 154, without departing from the scope of the present disclosure.

Referring still to FIGS. 5 and 7, the latch 74 of the latch assembly 194 extends from a second end 212 of the connection cartridge 34 and is positioned to be received by the second receiving space 158 of the rail cartridge 22. The latch 74 is configured to engage with a second striker 226 positioned proximate the second receiving space 158. It is contemplated that the latch assembly 194 may be any form of latch assembly configured to be operably coupled with the spring 66, and the latch 74 may be any latch for such a latch assembly. It is further contemplated that the latch 74 may be coupled with any receiving feature positioned within the rail cartridge 22 proximate the second receiving space 158 without departing from the scope of the present disclosure.

The latch assembly 194 is operable between a locked position and an unlocked position. When the latch 74 is not fully engaged with the second striker 226, the latch assembly 194 is in the unlocked position. Once the latch 74 is fully engaged with the second striker 226, the latch assembly 194 is in the locked position. In various examples, when the latch assembly 194 is in the unlocked position, the spring 66 coupled with the actuation member 62 may be fixed so that the spring 66 remains in the neutral state. When the latch assembly 194 is in the locked position, the spring 66 is released and may be rotated against the bias by force acting on the actuation member 62, as discussed below.

Referring again to FIGS. 1-7, the rail cartridge 22 may be operably coupled with the track 18. When the rail cartridge 22 is operably coupled with the track 18, the first electrical connector 30 may be electrically connected with, and configured to transmit power and/or data from, the vehicle 14. For installation of the seating assembly 78 within the vehicle 14, one or more connection cartridges 34 may be coupled with the seating assembly 78, as discussed previously. Each of the connection cartridges 34 is positioned such that the second slot 54 of the connection cartridge 34 is aligned with the first slot 26 of the rail cartridge 22. The coupling protrusion 214 of the connection cartridge 34 is then inserted into the first receiving space 154 of the rail cartridge 22 until the coupling protrusion 214 receives the first striker 218. The connection cartridge 34 is rotated about the first striker 218, as illustrated by arrow A in FIGS. 5 and 7, until the latch 74 is received by the second receiving space 158 of the rail cartridge 22. As the latch 74 is received by the second receiving space 158, the latch 74 is also engaged with the second striker 226 to move the latch assembly 194 into the locked position.

As the latch 74 is received by the second receiving space 158, the tab 206 of the actuator 70 and biased upward, as illustrated by arrow B (FIGS. 5 and 7). When the second striker 226 is fully engaged with the latch 74 and the latch assembly 194 is in the locked position, the spring 66 is released and the tab 206 is in the compressed state. The release of the spring 66 by the latch assembly 194 allows the upward movement of the tab 206 to bias the actuation member 62 upward into the second position, rotating the spring 66 against the bias of the spring 66, as illustrated by arrow C (FIGS. 5 and 7). Rotation of the spring 66 translates the second end 184 of the actuation member 62 toward the first end 210 of the connection cartridge 34. This movement simultaneously pushes the first end 182 of the actuation member 62 forward, moving the actuation member 62 into the second position.

As discussed above, the movement of the actuation member 62 into the second position biases the first end 182 of the actuation member 62 toward the first end 210 of the connection cartridge 34 and past the second electrical connector 58, as illustrated by arrow D in FIGS. 5 and 7. The links 186 are rotated to be vertically oriented when the actuation member 62 is moved forward. The second electrical connector 58 is lowered through the second slot 54 of the connection cartridge 34 by the rotation of the links 186. In some examples, the second electrical connector 58 may further be lowered through the first slot 26 of the respective rail cartridge 22 until the second electrical connector 58 engages with the first electrical connector 30. When the first and second electrical connectors 30, 58 are fully engaged, power and/or data may be transferred from the vehicle 14 to the seating assembly 78.

This configuration allows for easy interchanging and moving of the seating assemblies 78 for various vehicle uses while still providing power and/or data transfer through the track assembly 10. For example, the seating assemblies 78 may be readily moved forward and rearward within the vehicle 14 and/or may be removed from the vehicle 14, allowing for flexibility in the interior configuration of the vehicle 14. Likewise, the uniform use of the connection cartridges 34 and rail cartridges 22 allows for the seating assemblies 78 to be readily interchangeable without having to adjust the hardware of the vehicle 14. The engagement between the rail cartridge 22 and the respective track 18 further provides protection to the first and second electrical connectors 30, 58 and the conductor assembly 130 to prevent dirt, debris, and/or liquid from entering the track assembly 10.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A track assembly for a rail-mounted component of a vehicle comprising:
    a rail cartridge slidably coupled with a track and defining a first slot;
    a first electrical connector positioned within the rail cartridge; and
    a connection cartridge defining a channel, wherein the connection cartridge includes:
        first and second sidewalls joined by a bottom wall;
        a second electrical connector positioned within the channel and configured to selectively engage with the first electrical connector;
        an actuation member positioned within the channel and movable between first and second positions, wherein the actuation member is biased to the first position; and
        an actuator operably coupled with the actuation member to selectively move the actuation member into the second position against the bias.

2. The track assembly of claim 1, further comprising:
    a coupling protrusion extending from a first end of the connection cartridge and received by a first receiving space of the rail cartridge.

3. The track assembly of claim 1, further comprising:
    a retention feature that extends from one of the first and second sidewalls of the connection cartridge and receives the actuation member.

4. The track assembly of claim 1, wherein links are operably coupled with the second electrical connector and the actuation member.

5. The track assembly of claim 2, further comprising:
    a latch configured to engage a striker positioned proximate a second receiving space to couple the connection cartridge with the rail cartridge.

6. The track assembly of claim 5, wherein the first and second electrical connectors are electrically engaged when the latch is engaged with the striker.

7. A track assembly, comprising:
    a rail cartridge slidably coupled with a track and defining a slot;
    a first electrical connector positioned within the rail cartridge below the slot; and
    a connection cartridge defining a channel and including:
        a second electrical connector positioned within the channel and configured to selectively engage with the first electrical connector;
        an actuation member having a first end that is coupled with the second electrical connector; and
        a biasing member that urges the actuation member to a first position, wherein the actuation member is moved to a second position when an actuator contacts the rail cartridge of the track.

8. The track assembly of claim 7, further comprising:
    a latch coupled with the connection cartridge and configured to receive a striker positioned on the rail cartridge.

9. The track assembly of claim 8, wherein the latch is further configured to couple the connection cartridge with the rail cartridge.

10. The track assembly of claim 7, further comprising:
    a seal positioned about a periphery of the slot.

11. The track assembly of claim 7, wherein the first and second electrical connectors are configured to transfer at least one of power and data to and from a vehicle to a rail-mounted component.

12. The track assembly of claim 7, wherein the track includes first and second lateral walls each having a C-shape, and further wherein the rail cartridge is positioned between and substantially flush with each of the first and second lateral walls.

13. The track assembly of claim 7, wherein the connection cartridge is coupled with a storage unit.

14. A track assembly, comprising:
    a rail cartridge slidably coupled with a track;
    a first electrical connector positioned within the rail cartridge; and
    a connection cartridge defining a channel and including:
        a second electrical connector configured to selectively engage with the first electrical connector;
        an actuation member positioned within the channel of the connection cartridge and coupled with the second electrical connector, the actuation member movable between first and second positions; and
        an actuator operably coupled with the actuation member, wherein the actuator is moved upward to move the actuation member to the second position when the actuator contacts the rail cartridge of the track.

15. The track assembly of claim 14, wherein the actuator includes a tab extending downward from the connection cartridge, the tab configured to abut a top wall of the rail cartridge.

16. The track assembly of claim 14, wherein the connection cartridge further includes a latch coupled with an end of the connection cartridge.

17. The track assembly of claim 16, further comprising:
    a striker positioned within the rail cartridge proximate a receiving space, wherein the latch is configured to engage the striker.

18. The track assembly of claim 16, further comprising:
    a biasing member that urges the actuation member to the first position.

19. The track assembly of claim 18, wherein the biasing member is fixed when the latch is in an unlocked position, and further wherein the biasing member is rotatable when the latch is in a locked position.

* * * * *